United States Patent
Kovac et al.

(10) Patent No.: US 6,988,277 B2
(45) Date of Patent: Jan. 17, 2006

(54) SYSTEM AND METHOD FOR ADVERTISEMENT SPONSORED CONTENT DISTRIBUTION

(76) Inventors: Mario Kovac, Mandalicina 3, Zagreb (HR) 10000; Brian D. Litman, 950 N. Kings Rd., West Hollywood, CA (US) 90069; Davor Runje, V. Nazora 16, Zagreb (HR) 10000; Tomislav Uzelac, Grada Vukovara 237a, Zagreb (HR) 10000

( * ) Notice: Subject to any disclaimer, the term of this patent is extended or adjusted under 35 U.S.C. 154(b) by 966 days.

(21) Appl. No.: 09/778,234

(22) Filed: Feb. 6, 2001

(65) Prior Publication Data

US 2001/0056573 A1 Dec. 27, 2001

Related U.S. Application Data

(60) Provisional application No. 60/181,101, filed on Feb. 8, 2000.

(51) Int. Cl.
*H04N 7/025* (2006.01)
*H04N 7/10* (2006.01)
(52) U.S. Cl. .......................................... 725/34; 725/36

(58) Field of Classification Search ................ 725/32, 725/34, 35, 36, 25, 28; 705/14
See application file for complete search history.

(56) References Cited

U.S. PATENT DOCUMENTS

| RE33,808 E | 1/1992 | Wright, Jr. |
| 5,532,735 A | 7/1996 | Blahut et al. |
| 5,649,283 A | 7/1997 | Galler et al. |
| 5,708,478 A | 1/1998 | Tognazzini |
| 5,802,284 A | 9/1998 | Karlton et al. |
| 5,805,156 A | 9/1998 | Richmond et al. |
| 5,973,723 A | 10/1999 | DeLuca |
| 6,005,603 A | 12/1999 | Flavin |
| 6,154,207 A | 11/2000 | Farris et al. |
| 6,446,261 B1 * | 9/2002 | Rosser ......................... 725/34 |
| 6,588,015 B1 * | 7/2003 | Eyer et al. .................... 725/89 |
| 6,704,930 B1 * | 3/2004 | Eldering et al. .............. 725/36 |

* cited by examiner

Primary Examiner—Vivek Srivastava
(74) Attorney, Agent, or Firm—Norton R. Townsley; Belasco Jacobs & Townsley, LLP (57) ABSTRACT

A system and method for advertisement sponsored content distribution. It enables a person to experience advertising embedded content free of charge or to experience advertising free content plus an alternative advertising presentation for a consideration. This requires use of a special, system compatible playback device/program which must support alternative presentation capabilities (such as audio, still images, video, messages, etc.).

20 Claims, 8 Drawing Sheets

```
(34)
MASTER_FILE := {
    BLOCK_HDR            block_hdr;
    PROTECTED_BLOCK      protected_block;
    UNPROTECTED_BLOCK    unprotected_block;
};

(35)
FILE := {
    BLOCK_HDR            block_hdr;
    PROTECTED_BLOCK      protected_block;
    UNPROTECTED_BLOCK    unprotected_block;
};

(36)
BLOCK_HDR := {
    ID                   master_file_id;
    ID                   file_id;
    SEQUENCE OF {
        DEVICE_INFO      devices;
    }
    DEFAULT_DEVICE       default_device;
    ID                   clip_id;
    FLAG                 verify_unprot;
    DIGITAL_SIGNATURE    sig;
};

(37)
DEVICE_INFO := {
    DEVICE_TYPE          type; (37a)
    SEQUENCE OF {
        ADV_GROUP        adv_group;
    }
};

(38)
ADV_GROUP := {
    ADV_TYPE             type; (38a)
    SEQUENCE OF {
        ADV_REF          adv_ref;
    }
}

(39)
ADV_REF := {
    ID                   id;
    REQ_LEVEL            level;
};

(40)
REQ_LEVEL := ONE OF {
    REQUIRED, OPTIONAL
};

(41)
DEFAULT_DEVICE := {
    SEQUENCE OF {
        ADV_GROUP        adv_group;
    }
}

(42)
PROTECTED_BLOCK := {
    SEQUENCE OF {
        ADVERTISEMENT    advertisement;
    }
    OPTIONAL ORG_CLIP    org_clip;
};

(43)
ADVERTISEMENT := {
    ADV_INFO             adv_info;
    DIGITAL_SIGNATURE    sig;
};

(44)
ADV_INFO := {
    ID                   id;
    ADV_TYPE             type;
    ENCRYPTION_TYPE      encryption;
    KEY_DATA             key_data;
    CONTENT              content;
};

(45)
ORG_CLIP := {
    ORG_CLIP_INFO        org_clip_info;
    DIGITAL_SIGNATURE    sig;
}

(46)
ORG_CLIP_INFO := {
    ID                   id;
    TIME                 begin; (46a)
    ENCRYPTION_TYPE      encryption;
    KEY_DATA             key_data;
    CONTENT              content;
};

(47)
UNPROTECTED_BLOCK := {
    CONTENT              content;
    DIGITAL_SIGNATURE    sig,
};
```

FIGURE 8

SYSTEM AND METHOD FOR ADVERTISEMENT SPONSORED CONTENT DISTRIBUTION

CROSS REFERENCE TO RELATED APPLICATIONS

The Applicants claim the benefit of their Provisional Application, Ser. No. 60/181,101 filed Feb. 8, 2000.

BACKGROUND OF THE INVENTION

This invention relates to systems and methods for advertisement sponsored efficient distribution of content such as audio, video and other types of multimedia, electronic files etc. It also relates to systems for handling existing and future business and distribution models.

As is well known, the presentation of much audio and video programming, and many Internet web sites (content) can only be provided to the public if they are paid for by embedded advertising. This is why radio and TV programs are constantly interrupted by paid advertising and there is constantly changing banner advertising on many web sites. The ways that people are being exposed to advertising is constantly changing as technology progresses. On the other hand, the public would rather experience such content free of the advertising. Many people are extremely annoyed by the advertisements would rather not experience the content than be exposed to the ads.

In response to the aggravation of the ads, many inventors have tried to come up with systems to eliminate them from the content. U.S. Pat. No. 5,532,735 discloses a technique for an interactive television (ITV) system wherein viewers are allowed to select a desired level of advertisements with which they are provided. The technique comprises transmitting to a subscriber location a program and a set of advertisements (collectively referred to as a "show"). The set of advertisements is selected based upon an input from a user associated with the subscriber location. The input comprises an indicator of an amount of advertisements in the set of advertisements. Another feature of the ITV system described is that it allows for adjusting an amount of a bill of a subscriber to interactive television services based upon the amount of advertisements viewed in a show.

U.S. Pat. No. 5,973,723 discloses a device containing a plurality of pre-stored program clips corresponding to portions of program information for presentation to a user. A comparator compares the program clips with program information and causes selection of an alternate program in response to a match. In one embodiment, the program information corresponds to a television program and a program clip corresponds to a video frame at the beginning of an undesirable commercial, resulting in a television that automatically selects an alternate program in response an original program having an undesirable commercial. After a predetermined time associated with the video clip the television automatically returns to the original program. The invention also enables creation of new program clips based upon received program information.

However, such inventions are inimical to the desires of advertisers and have not seen commercial implementation. One method of resolving the tension between the desires of the advertisers (to expose as many people as possible to their advertising) and the desires of the public (to be exposed to as few advertisements as possible in their daily lives) would be to allow users of content to at least select how they will be exposed to advertising. For example, instead of having their favorite TV program interrupted at intervals with commercials, the viewer could, for a fee, choose to see all the advertising at the beginning or the end of the program. Or a listener could, again for a fee, choose to have the advertisements presented in video form while listening so as not interrupt the music. Or a web browser could choose, again for a fee, to hear rather than see banner advertising so as to see more information on screen.

Development of a system which can allow users to choose how to experience advertising represents a great improvement in the fields of marketing and advertising and satisfies a long felt need of the public as well as advertisers and marketers.

SUMMARY OF THE INVENTION

It is an object of invention to provide a system and method for advertisement sponsored content distribution. Content Owners (COs) provide content and together with Marketing Agencies (MAs) they create business rules for embedding advertising into the content. Those rules can contain technical information (e.g. maximum length of the inserted advertisement, defined position within the content, etc), business information (e.g. CO fees, type of fee etc.), copyright information, cryptography, coding, watermarking information and other types of information. Marketing Agencies embed advertising in the content provided by Content Owners and create content files as specified in this invention. By embedding advertising into content, Marketing Agencies can make the content available to users free of charge.

This invention provides that advertising is embedded into content in such a way that the user is always exposed to it. An example of this form is an audio advertisement embedded into a music file, or a video advertisement embedded into movie. The user can use/play/experience such content for free on any playback device/program, since all additional information is placed in data blocks that do not affect the standard content format. This invention permits a standard playback device/program to simply skip this additional information. To remove a nagging advertisement, this invention also involves a special, system compatible playback device/program.

If playback is executed on such a system compatible device and if this device supports alternative advertisement presentation capabilities (such as audio, still images, video, messages, etc.) a user can be exposed to the advertisement in alternative format thus enabling content to be used/experienced in it's original, unchanged form without advertisement. By presenting this alternative advertisement to the user, the playback device will replace the advertisement embedded into content with the original, advertisement free, content. In this way, the user can fully enjoy the content and still be exposed to the advertisement. The system also allows a mechanism for usage monitoring that could be used in reporting of advertisement exposure.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

Figure 8:
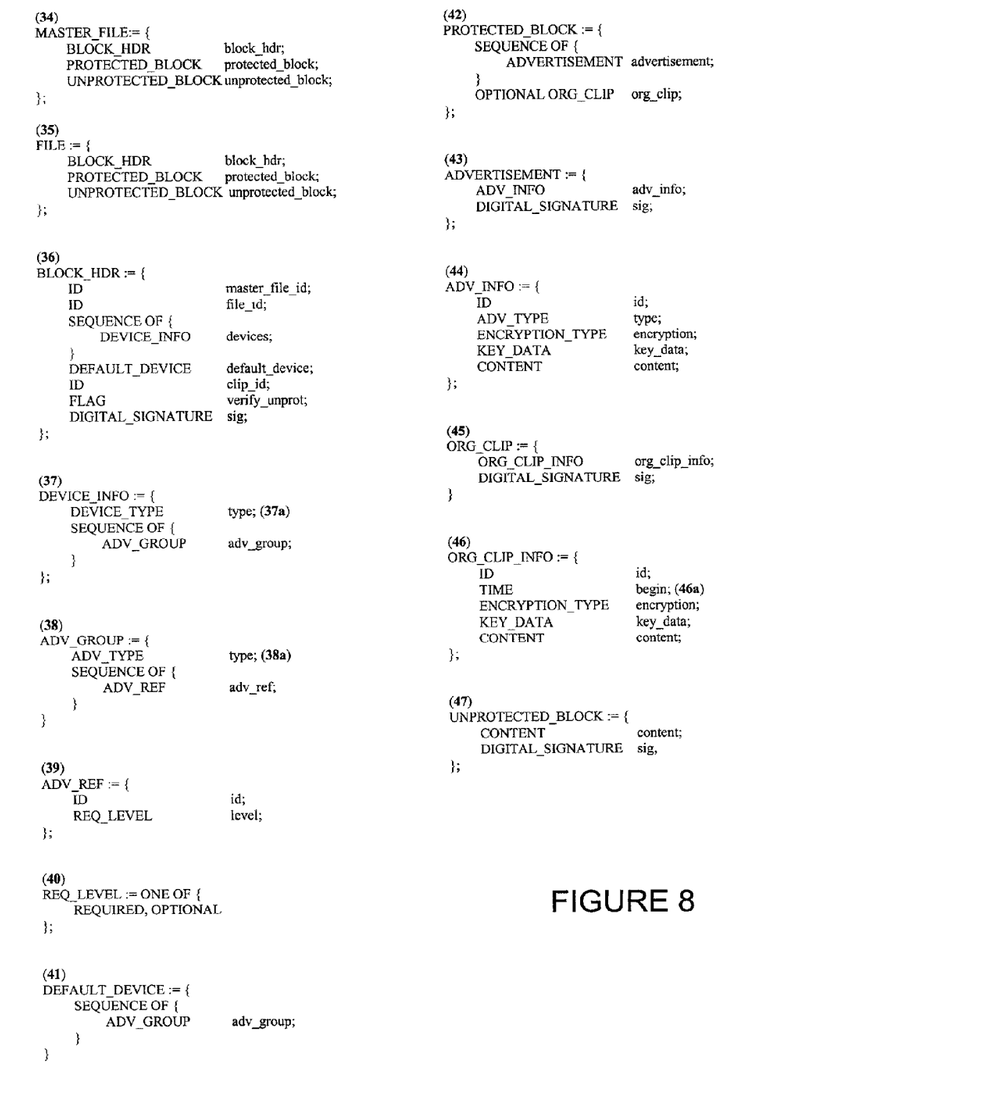
FIG. 8 is a flowchart illustrating data structures used in this invention.

FIG. 8 defines the various data structures used in this invention. The data structures

| | | |
|---|---|---|
| 34 | MASTER_FILE | template for creating files - contains no advertising |
| 35 | FILE | contains content and advertising |
| 36 | BLOCK_HDR | contains general information about the complete file, content and associated advertising |
| 37 | DEVICE_INFO | information about the playback device |
| 38 | ADV_GROUP | the group into which advertisements may be classified |
| 39 | ADV_REF | location where each advertisement is identified and referenced |
| 40 | REQ_LEVEL | defines rendering of selected advertisements |
| 41 | DEFAULT_DEVICE | the default device type |
| 42 | PROTECTED_BLOCK | contains alternative advertisments and, at the option of the creator, the original, unchanged portion of the content |
| 43 | ADVERTISEMENT | advertising |
| 44 | ADV_INFO | contains advertisement and associated information |
| 45 | ORG_CLIP | the original, unchanged portion of the content |
| 46 | ORG_CLIP_INFO | defines key data about the original, unchanged portion of the content |
| 47 | UNPROTECTED_BLOCK | contains major content |

Further definition will be provided by FIGS. 1–7 and the description presented below.

Figure 1:
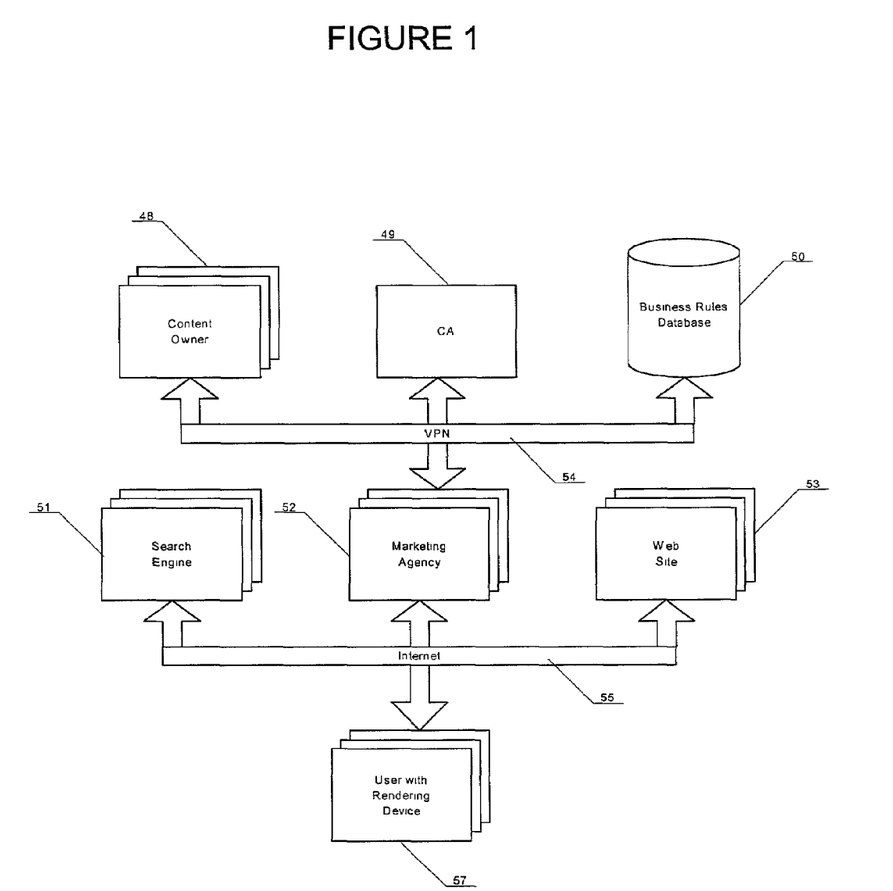
FIG. 1 is a flowchart providing a system overview.

FIG. 1 is a system overview. The Content Owner 48 provides content to the system. Examples of content are music, a video program and an electronic file. A Certificate Authority 49 issues certificates to all other parties in the system. Certificates are used to ensure security and can be implemented using some known standard or a proprietary scheme. A Business Rules Database (BRDB) 50 stores business rules associated with each particular MASTER_FILE 34. The Marketing Agency 52 merges the MASTER_FILE 34 with advertisements according to the rules defined in the BRDB 50. Web sites 53 can serve as one source that makes the content publicly available. A search engine 54 can be used for easy, and user friendly search of the content available in the system. All parties on the system are connected via a Virtual Private Network (VPN) and the Internet. As technology evolves other methods of networking will be utilized.

Figure 2:
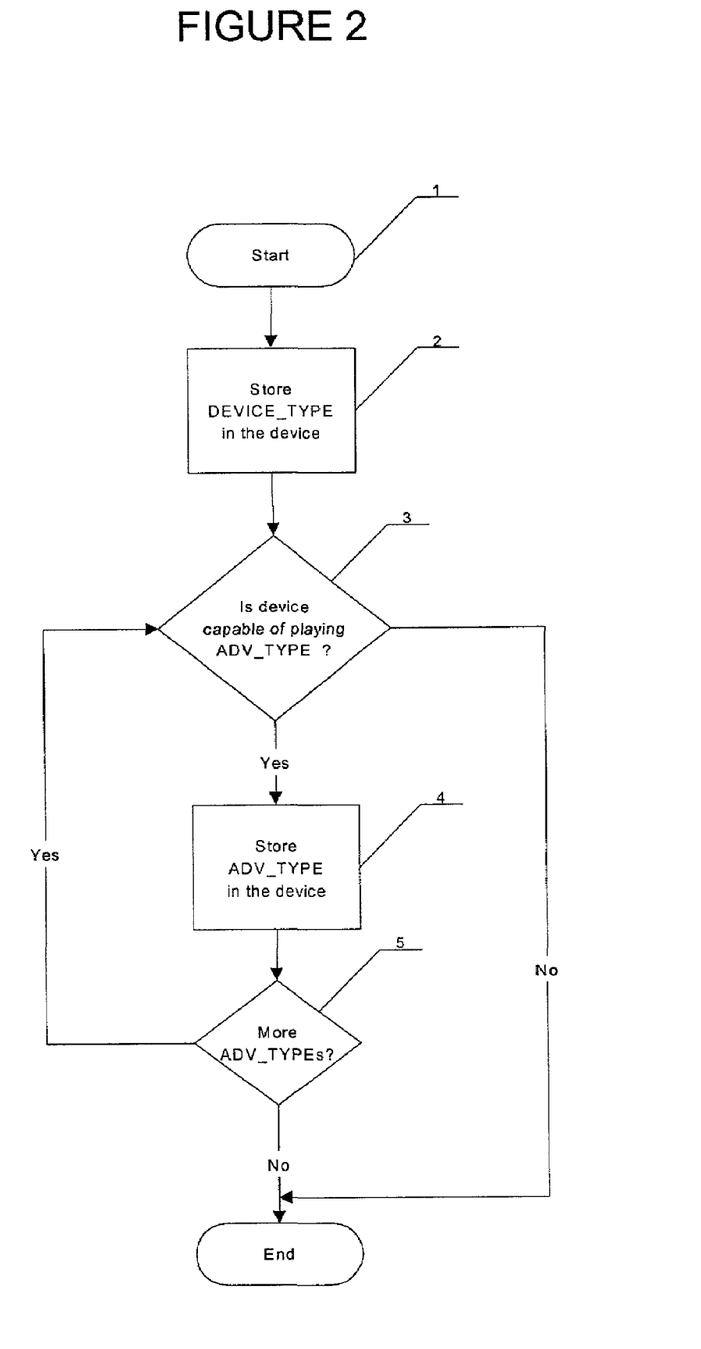
FIG. 2 is a flowchart illustrating device initalization.

FIG. 2 shows the basic initialization steps required to initialize system compatible devices as defined by the current invention. The preferred embodiment allows devices to be either hardware or software implementation. In the first step 2, the device is assigned a device type (DEVICE_TYPE 37a). In the next steps (3,4,5), information about all advertisement types (ADV_TYPE 38a e.g. MP3 files, JPEG video files, text, etc.) that device is capable of playing is stored in the device.

Figure 3:
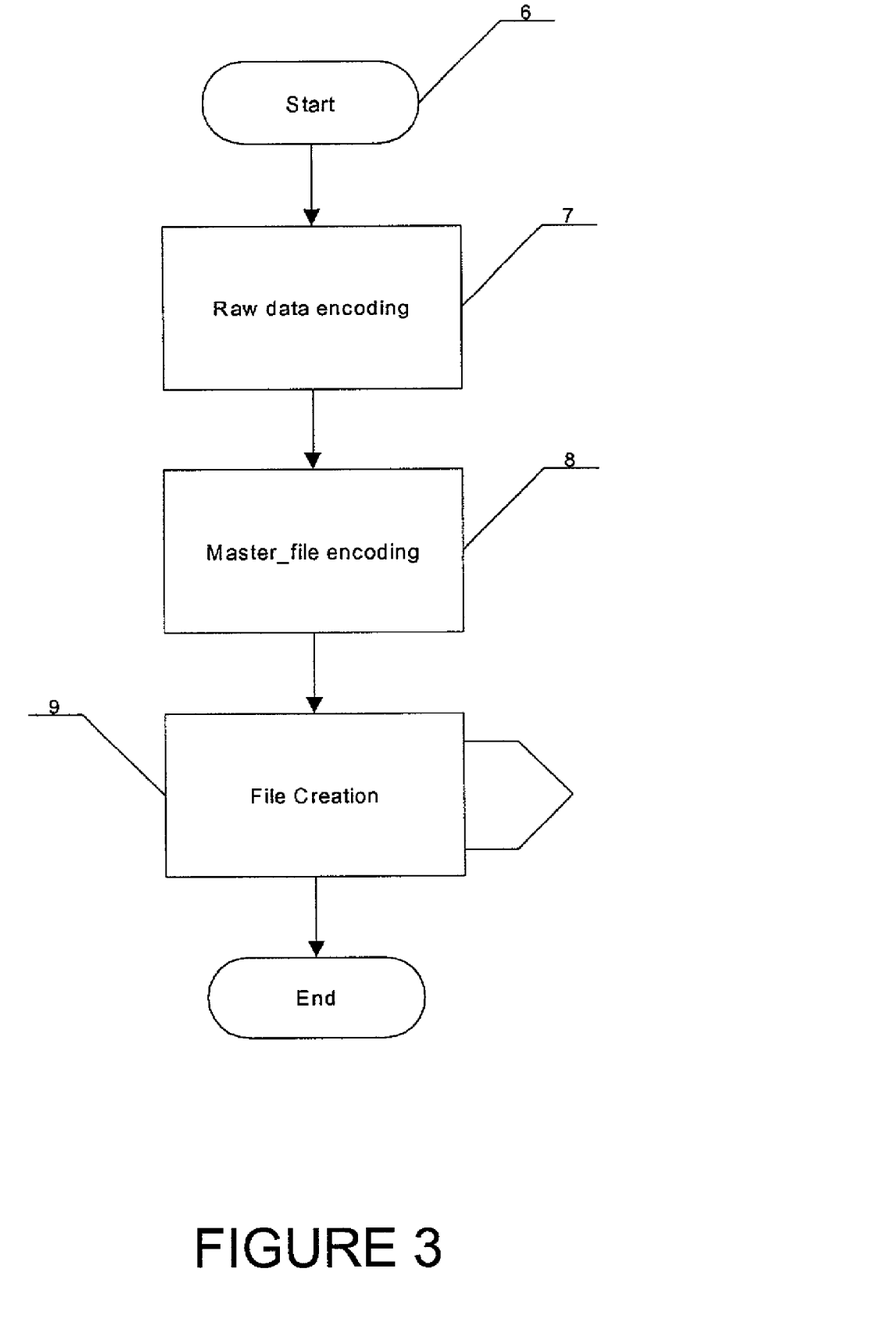
FIG. 3 is a flowchart illustrating the master file creation process.

FIG. 3 presents the three basic steps in creation of system compatible content files. The Content Owner may choose to encode the content in some appropriate form 7 (e.g. using compression algorithms) and may attach some data to it. This invention defines how such data should be encoded 8 in the MASTER_FILE 34. This file is used as template for later sponsored content file creation 9. The MASTER_FILE 34 structure and the FILE 35 structure are equivalent with the exception that MASTER_FILE 34 does not contain any actual advertisement, and that MASTER_FILE 34 has associated business rules in the BRDB 50. Each advertisement is stored in the structure ADV_INFO 44. This structure contains advertisement content and associated information for this advertisement.

Figure 4:
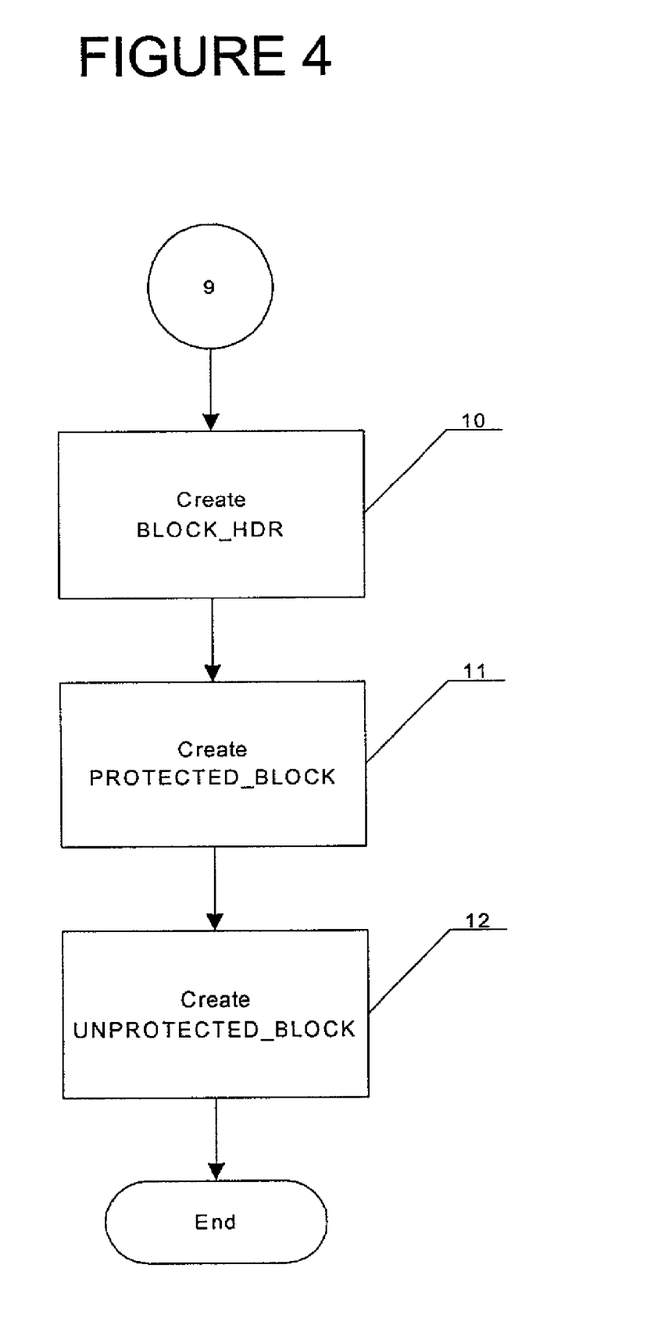
FIG. 4 is a flowchart illustrating file creation.

FIG. 4 shows that system compatible files should contain three basic data blocks (10,11,12). BLOCK_HDR 36 contains general information about the complete file, content and associated advertisement. PROTECTED_BLOCK 42 contains ADVERTISEMENT(s) 43 and the original unchanged content ORG_CLIP 45, segregated from each other. UNPROTECTED_BLOCK 47 contains advertisement(s) seamlessly embedded in the content.

Figure 5:
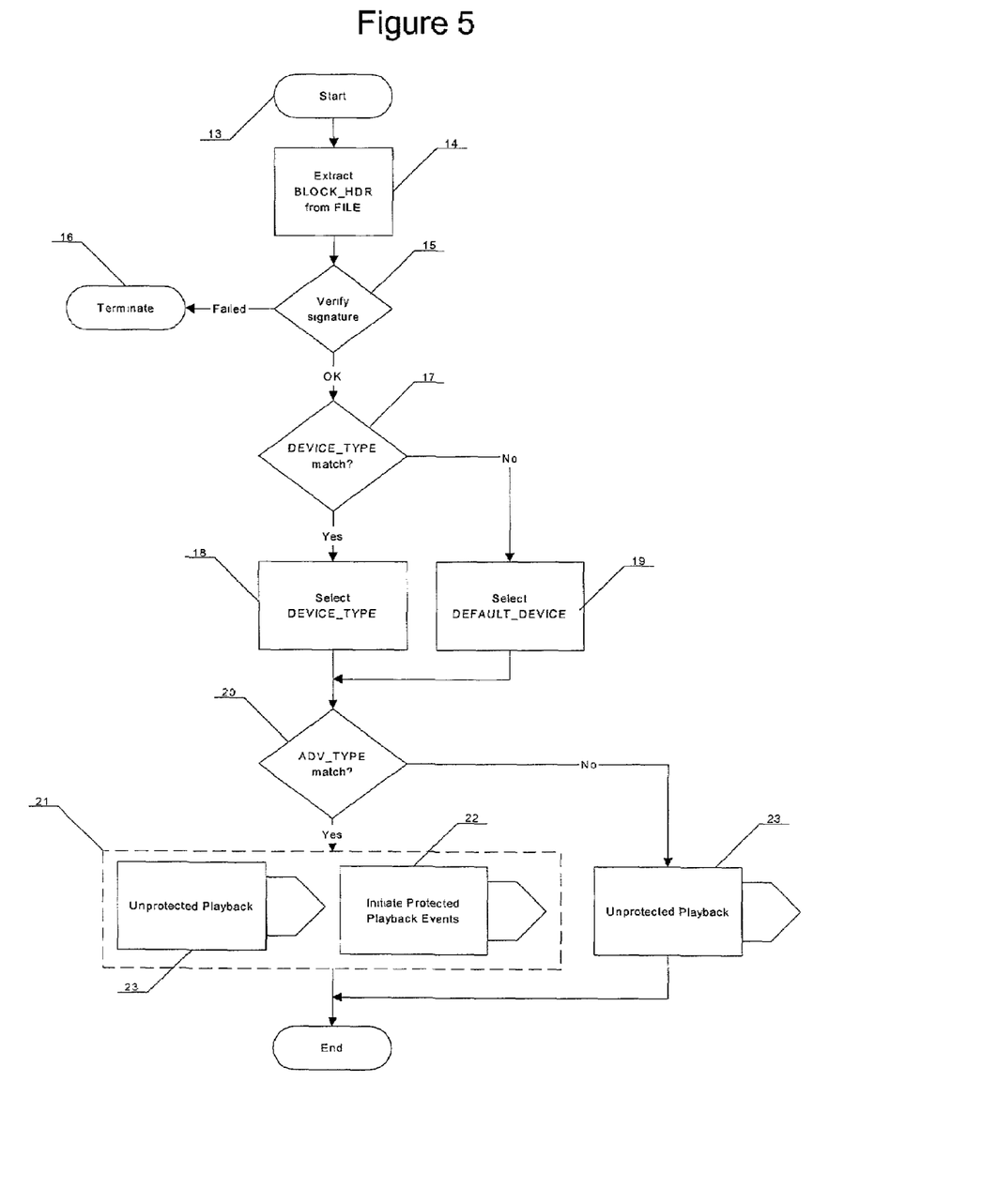
FIG. 5 is a flowchart illustrating playback.

An overview of playback operation is given in FIG. 5. Playback 13 on a system compatible playback device represents the most important part of the current invention. After the playback of the advertisement sponsored FILE 35 is started, the playback device/program will extract 14 BLOCK_HDR from the FILE 35, and verify it's signature 15. If the verification 15 fails, playback will not start 16. If the verification 15 is successful, the device/program will determine if FILE 35 includes special rules for that particular device. This is verified by comparing 17 DEVICE_TYPE 37a of the device to DEVICE_TYPEs 37a listed in the BLOCK_HDR 36. If the DEVICE_TYPE 37a matches the program selects 18 that DEVICE_TYPE 37a. If the DEVICE_TYPE 37a does not match, the program selects 19 a DEFAULT_DEVICE 41. After the DEVICE_TYPE 37a is matched, the application verifies 20 if the device/program supports presentation of any TYPE 38a of ADVERTISEMENT 43 that is included in the FILE 35. If there is at least one TYPE 38a supported, the playback device initiates Protected Playback Events 22 or Unprotected Playback 23 as desired by the user. If no TYPEs 38a are supported, the playback device only allows Unprotected Playback 23.

Figure 6:
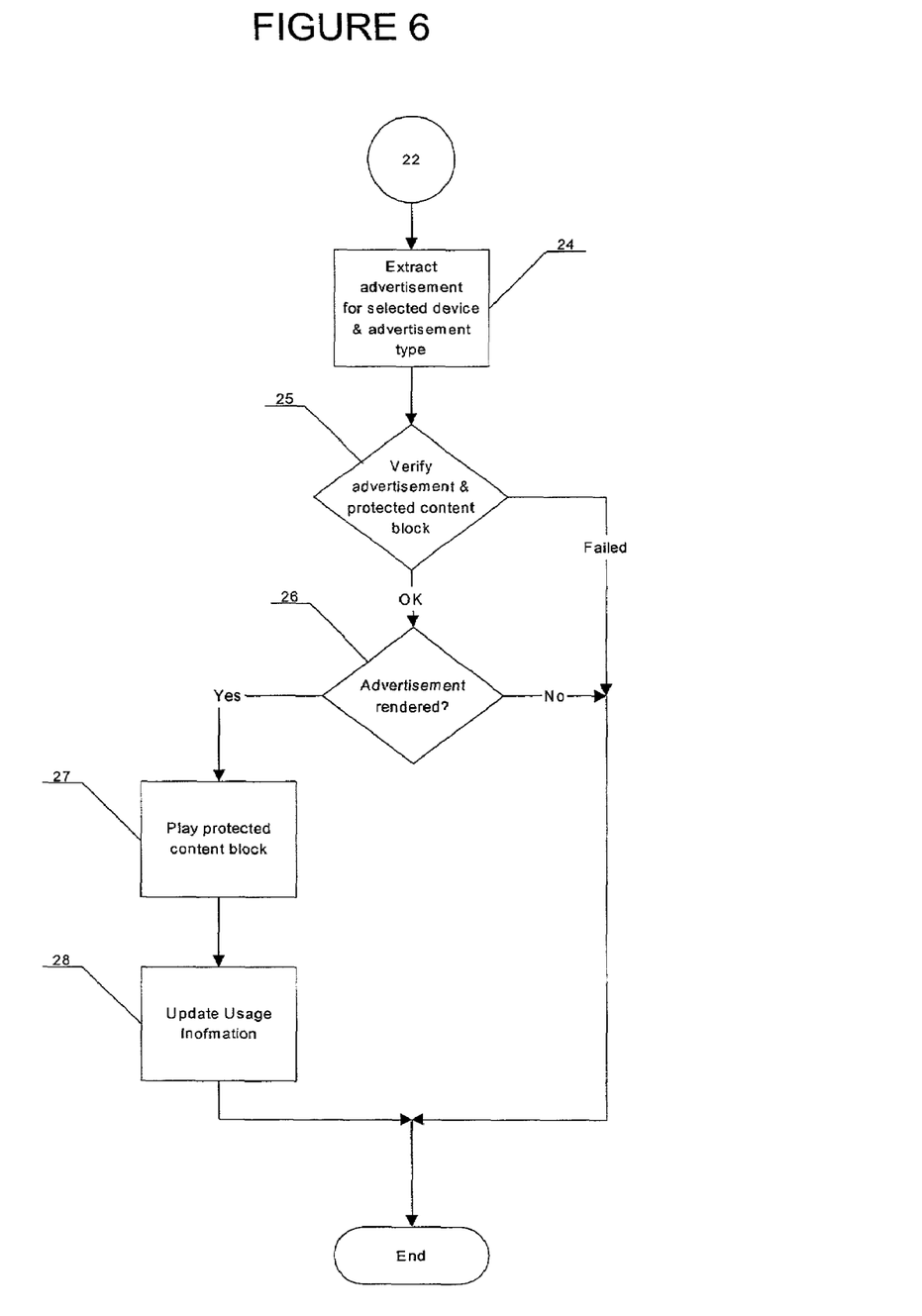
FIG. 6 is a flowchart illustrating a protected playback event.

FIG. 6 illustrates Protected Playback 22. At the moment defined in ORG_CLIP_INFO 46 (TIME 46a), the playback device will attempt to present the alternative ADVERTISEMENT 43 included in the FILE 35. As a first step in this process, extraction and verification of ADVERTISEMENT 43 and protected content is performed 24, 25. If this verification fails, the system will not perform any action and standard (unprotected) playback will continue. If this verification is successful, the device will verify that the alternative ADVERTISEMENT 43 has been rendered and presented in the defined manner 26. If the user cancels the alternative ADVERTISEMENT 43 (e.g. by minimizing a window showing a video advertisement), or in any other way this alternative ADVERTISEMENT 43 has not been adequately presented, the system will not perform any action and standard playback will continue. If such alternative ADVERTISEMENT 43 has been correctly presented, the original content, PROTECTED_BLOCK 42 will be decrypted and played 27 instead of the one containing embedded ADVERTISEMENT 43 as described in ORG_CLIP_INFO 46. Also, usage information will be updated at this time 28.

Figure 7:
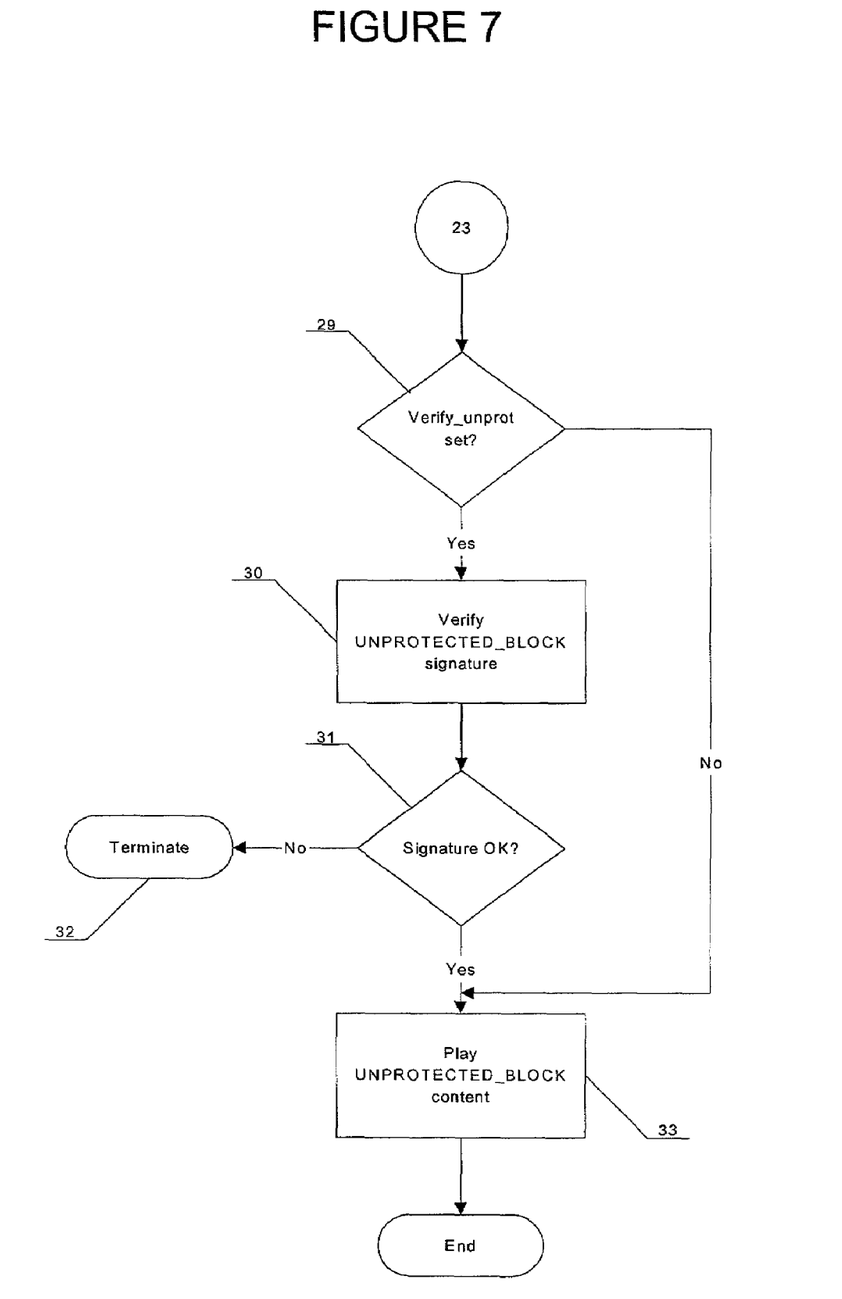
FIG. 7 is a flowchart illustrating an unprotected playback event.

FIG. 7 illustrates Unprotected Playback 23. Unprotected Playback 23 is playback of the basic content that includes embedded ADVERTISEMENT 43. It is the equivalent of playback on any device including devices that are not compatible with presented invention. The system verifies that the information is unprotected 29 and then allows play of the UNPROTECTED_BLOCK 47 content 33. This invention optionally adds verification of the UNPROTECTED_BLOCK 47 signature 30, 31. This verification process is based on the preferences set in the BLOCK_HDR 36. If the signature cannot be verified, play will not commence.

Advertisements are embedded into the file and organized to ensure efficient implementation of the decoder and controlled set of priorities. One example of such organization could be the one described in BLOCK_HDR 36. For each system compatible playback device a DEVICE_TYPE (37a) is assigned (see FIG. 2, step 2). In the process of embedding an advertisement in the file, the Marketing Agency can include rules that apply for presenting advertisements for a set of predefined device types (defined by DEVICE_INFO 37) and rules that apply for any other devices not directly listed earlier (DEFAULT_LDEVICE 41). For each of the above device types (either defined or default) further levels of hierarchy can be defined.

One possible example of such hierarchical organization is defined using advertisement groups (ADV_GROUP 38). Since each device could be able to render one or a few types of advertisements (e.g. JPEG2000 still image, MP3 audio, or text message, etc.) those are listed hierarchically using advertisement type (ADV_TYPE 38a). Within the defined type there can be several advertisements. Each advertisement is identified and referenced in ADV_REF 39. Optionally, the system does not require rendering of selected advertisements, which can be defined using REQ_LEVEL 40. Other types of hierarchical organizations could also be defined.

An example of one simple file organization is: Sport store "X-SPORTS" provides ads to be embedded into a music file. "X-SPORTS" provides ads in three different types (formats), a short MPEG video clip, three GIF images and two text messages. The music file is created for all devices on the market and hence all advertisements are embedded into the file. Within the BLOCK_HDR 36 structure, the Marketing Agency can create rules for GSM phones only (preferably GIF format), for PDAs (either GIF or text), for PCs only (MPEG or GIF) and for other devices. The order of priority is MPEG then GIF and then text. Additionally, the order of individual ads of the same type (e.g. GIF) can also be defined.

The system and method for advertisement sponsored content distribution has been described with reference to a particular embodiment. While the preferred embodiment involves distribution over networks (e.g. the Internet), it should be clear to those who are familiar with the field to which this invention pertains that other forms of distribution, such as by wireless broadcasting and on distributed magnetic (e.g. audio and video tape) and as by wireless broadcasting and on distributed magnetic (e.g. audio and video tape) and optical (e.g. CD and DVD) media will work equally well. Other modifications and enhancements can be made without departing from the spirit and scope of the claims that follow.

What is claimed is:

1. A system for alternative presentation of advertising comprising:
   a. a file (FILE); said file including a block including content and advertising segregated from each other (PROTECTED_BLOCK), and a block including said content, and said advertising embedded in said content (UNPROTECTED_BLOCK); said file being amenable for play on any playback means; and
   b. a special playback means for:
      i. separating said advertising from said content in said PROTECTED BLOCK, playing back said content, and making an alternative presentation of said advertising, providing a user desires it and is authorized, and said playback means includes a means for alternative presentation of said advertising; and
      ii. otherwise, playing back said UNPROTECTED_BLOCK; and
   c. a means for distributing said FILE to said special playback means;

whereby when a user plays said FILE, said content is played and said advertising is presented in an alternative format, providing said user is authorized and said special playback means includes a means for alternative presentation of said advertising; otherwise, said content with embedded advertising is played.

2. A system as claimed in claim 1 further comprising special business rules which define the relationship of the content to the advertising and contains technical information, business information, copyright information, cryptography information, coding information and watermarking information.

3. A system as claimed in claim 1 in which said PROTECTED_BLOCK and said UNPROTECTED_BLOCK are composed and assembled in a secure manner.

4. A system as claimed in claim 1 in which said system additionally detects whether said advertising is alternatively presented and logs said presentation.

5. A system as claimed in claim 1 in which distribution is over a network.

6. A system as claimed in claim 1 in which distribution is over the Internet.

7. A system as claimed in claim 1 in which distribution is by wireless broadcasting.

8. A system as claimed in claim 1 in which distribution is via magnetic media.

9. A system as claimed in claim 1 in which distribution is via optical media.

10. A method for alternative presentation of advertising comprising the steps of:
    a. creating a file (FILE); said file including a BLOCK_HDR, an UNPROTECTED_BLOCK and a PROTECTED_BLOCK; said PROTECTED_BLOCK including content and advertising segregated from each other; said UNPROTECTED_BLOCK including said content, and said advertising embedded in said content; said BLOCK_HDR including general information about said file, said content and said advertising; said FILE being amenable for play on any playback means;
    b. providing a playback device having a means for alternative presentation of said advertising designed to:
       i. separate said advertising from said content in said PROTECTED_BOCK, play back said content, and make an alternative presentation of said advertising; and
       ii. play back said UNPROTECTED_BLOCK;

c. distributing said FILE to said playback device;
d. extracting BLOCK_HDR from said FILE;
e. verifying BLOCK_HDR's signature;
f. if verification fails, terminating the program;
g. if the verification is successful, comparing the type of said playback device (DEVICE_TYPE) to DEVICE_TYPEs listed in the BLOCK_HDR;
h. if there is a match, selecting that DEVICE_TYPE
i. if there is no match selecting a default device type (DEFAULT_DEVICE);
j. verifying if said playback device supports presentation of any type of advertising that is included in said FILE;
k. if there is at least one type supported, initiating protected playback, providing said user desires it and is authorized, otherwise initiating unprotected playback; unprotected playback being playback of said embedded content and advertising, and protected playback being playback of said content and alternative presentation of said advertising; and
l. if no types are supported, initiating unprotected playback.

11. A method as claimed in claim 10 in which protected playback comprises the steps of:
  a. extracting said content and advertising from said PROTECTED_BLOCK;
  b. verifying said content and advertising;
  c. if verification fails, initiating unprotected playback;
  d. if verification is successful, alternatively presenting said advertising and verifying that said advertising is properly presented;
  e. if said advertising is not properly presented, reverting to unprotected playback;
  f. if said advertising is properly presented, extracting said content, from said PROTECTED_BLOCK and playing said content; and
  g. updating usage information for said advertising.

12. A method as claimed in claim 10 in which unprotected playback additionally comprises the steps of:
  a. adding verifying signature information to said UNPROTECTED_BLOCK;
  b. verifying that the information is properly signed;
  c. if the information is properly signed, allowing play to commence; and
  d. if the signature cannot be verified, not allowing play to commence.

13. A method as claimed in claim 10 further comprising the step of defining business rules which define the relationship of the content to the advertising and contains technical information, business information, copyright information, cryptography information, coding information and watermarking information.

14. A method as claimed in claim 10 further comprising the step of composing said PROTECTED_BLOCK and said UNPROTECTED_BLOCK in a secure manner.

15. A system as claimed in claim 10 further comprising the steps of:
  a. detecting whether said advertising is alternatively presented; and
  b. loging said alternative presentation.

16. A method as claimed in claim 10 in which said distributing step is performed over a network.

17. A method as claimed in claim 10 in which said distributing step is performed over the Internet.

18. A method as claimed in claim 10 in which said distributing step is performed by wireless broadcasting.

19. A method as claimed in claim 10 in which said distributing step is performed via magnetic media.

20. A method as claimed in claim 10 in which said distributing step is performed via optical media.

* * * * *